United States Patent
Kong et al.

(10) Patent No.: US 10,710,445 B2
(45) Date of Patent: Jul. 14, 2020

(54) POWERTRAIN FOR HYBRID VEHICLE

(71) Applicants: Hyundai Motor Company, Seoul (KR); Kia Motors Corporation, Seoul (KR)

(72) Inventors: Jin Kook Kong, Suwon-si (KR); Yeon Min Cheong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/189,254

(22) Filed: Nov. 13, 2018

(65) Prior Publication Data

US 2019/0263248 A1 Aug. 29, 2019

(30) Foreign Application Priority Data

Feb. 28, 2018 (KR) .................. 10-2018-0024124

(51) Int. Cl.
| | |
|---|---|
| *B60K 6/365* | (2007.10) |
| *B60K 6/445* | (2007.10) |
| *B60W 10/02* | (2006.01) |
| *F16H 3/72* | (2006.01) |
| *B60W 10/08* | (2006.01) |
| *B60W 20/30* | (2016.01) |
| *F16H 37/10* | (2006.01) |

(Continued)

(52) U.S. Cl.
CPC ............. *B60K 6/365* (2013.01); *B60K 6/445* (2013.01); *B60W 10/02* (2013.01); *B60W 10/08* (2013.01); *B60W 20/30* (2013.01); *F16H 3/728* (2013.01); *F16H 37/10* (2013.01); *B60W 10/06* (2013.01); *B60W 10/115* (2013.01)

(58) Field of Classification Search
CPC ......... F16H 37/10; F16H 3/728; B60K 6/365; B60K 6/445; B60K 2006/381; B60K 6/387; B60W 20/30; B60W 10/08; B60W 10/02; B60W 10/115; B60W 10/06; B60W 20/20
USPC ........................................... 475/4, 5
See application file for complete search history.

(56) References Cited

U.S. PATENT DOCUMENTS

| | | | | |
|---|---|---|---|---|
| 2010/0116235 A1* | 5/2010 | Imamura | ............... | B60W 20/15 123/179.3 |
| 2013/0260936 A1* | 10/2013 | Takei | ................... | B60K 6/365 475/5 |

(Continued)

FOREIGN PATENT DOCUMENTS

KR 10-2011-0052148 A 5/2011

*Primary Examiner* — Jeffrey A Shapiro
(74) *Attorney, Agent, or Firm* — Morgan, Lewis & Bockius LLP

(57) ABSTRACT

A powertrain for a hybrid vehicle may include a planetary gear set; a first motor-generator connected to one rotation element of the planetary gear set and an engine connected to the first motor-generator; a second motor-generator connected to another rotation element of the planetary gear set; a second clutch connected to the other rotation element of the planetary gear set and a second drive gear connected to the second clutch; a first clutch connected to the rotation element to which the first motor-generator is connected and a first drive gear connected to the first clutch; and an output shaft having a first driven gear and a second driven gear engaged in the first drive gear and the second drive gear, respectively.

12 Claims, 4 Drawing Sheets

(51) Int. Cl.
*B60W 10/06* (2006.01)
*B60W 10/115* (2012.01)

(56) References Cited

U.S. PATENT DOCUMENTS

| | | | |
|---|---|---|---|
| 2015/0148168 A1* | 5/2015 | Park | B60K 6/36 475/5 |
| 2015/0148172 A1* | 5/2015 | Puiu | B60K 6/365 475/5 |
| 2015/0369350 A1* | 12/2015 | Lee | B60K 6/387 475/5 |
| 2016/0061305 A1* | 3/2016 | Kim | F16H 37/046 475/5 |
| 2016/0152130 A1* | 6/2016 | Kim | B60K 6/36 475/5 |
| 2016/0167644 A1* | 6/2016 | Choi | F16H 3/52 477/3 |
| 2017/0349038 A1* | 12/2017 | Shinohara | B60K 17/046 |
| 2018/0022199 A1* | 1/2018 | Kim | B60K 6/44 475/5 |

* cited by examiner

FIG. 2

| MODE | | BK1 | CL1 | CL2 | ENGINE | MG1 | MG2 |
|---|---|---|---|---|---|---|---|
| EV MODE | | on | | on | off | | Motor |
| HEV MODE | HEV MODE 1 | | | on | on | POWER GENERATION | Motor |
| | HEV MODE 2 | | | on | on | NON-POWER GENERATION | Motor |
| | HEV MODE 3 | | | on | on | Motor | Motor |
| ENGINE MODE | ENGINE MODE 1 | | on | | on | NON-POWER GENERATION | |
| | ENGINE MODE 2 | | on | | on | POWER GENERATION | |
| | ENGINE MODE 3 | | on | | on | Motor | |
| NEUTRAL | | | | | on or off | | |
| NEUTRAL/ BATTERY CHARGING | | | | | on | POWER GENERATION | |
| BACKWARD | | on | | | | | Motor(-) |

POWERTRAIN FOR HYBRID VEHICLE

CROSS REFERENCE TO RELATED APPLICATION

The present application claims priority to Korean Patent Application No. 10-2018-0024124 filed on Feb. 28, 2018, the entire contents of which is incorporated herein for all purposes by this reference.

BACKGROUND OF THE DISCLOSURE

Field of the Disclosure

The present invention relates to a powertrain for a hybrid vehicle, and more particularly, to a configuration of a powertrain configured for implementing an engine mode in which a gear ratio is fixed.

Description of Related Art

A hybrid vehicle appropriately harmonizes the powers of an engine which is an internal combustion engine and a motor driven by electricity to supply a driving force, thus enhancing fuel efficiency of the vehicle.

The enhancement of fuel efficiency of the hybrid vehicle is achieved by mainly driving the engine and the motor with an appropriate combination thereof to suit each characteristic depending upon the driving conditions of the vehicle so that the hybrid vehicle is driven by the power source more suitable for the provided driving conditions.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a hybrid vehicle configured for implementing various operation modes in a relatively simple configuration including an engine mode in which an engine is operated under a fixed gear ratio so that the engine may be stably operated at a relatively high vehicle speed in a highly efficient region to improve fuel efficiency of the hybrid vehicle, enhancing fuel efficiency of the hybrid vehicle even while reducing cost of the vehicle.

The powertrain for the hybrid vehicle of the present invention for achieving the object is characterized by being configured to include: a planetary gear set; a first motor-generator connected to one rotation element of the planetary gear set and an engine connected to the first motor-generator; a second motor-generator connected to another rotation element of the planetary gear set; a second clutch connected to the other rotation element of the planetary gear set and a second drive gear connected to the second clutch; a first clutch connected to the rotation element to which the first motor-generator is connected and a first drive gear connected to the first clutch; and an output shaft having a first driven gear and a second driven gear engaged in the first drive gear and the second drive gear, respectively.

The rotation element to which the first motor-generator is connected may be further provided with a brake that can constrain the rotation thereof.

Among the rotation elements of the planetary gear set, the rotation element connected to the engine may be a ring gear, the rotation element connected to the second clutch may be a carrier, and the rotation element connected to the second motor-generator may be a sun gear.

A gear ratio between the first drive gear and the first driven gear may be formed to be different from a gear ratio between the second drive gear and the second driven gear.

A third clutch may be further provided between the engine and the first motor-generator to connect or disconnect each other.

The present invention can implement various operation modes in a relatively simple configuration including an engine mode in which an engine is operated under a fixed gear ratio so that the engine may be stably operated at a relatively high vehicle speed in a highly efficient region to improve fuel efficiency of the hybrid vehicle, enhancing fuel efficiency of the hybrid vehicle even while reducing cost of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table summarizing an operation mode of the powertrain for the hybrid vehicle in accordance with various aspects of the present invention.

Figure 1:
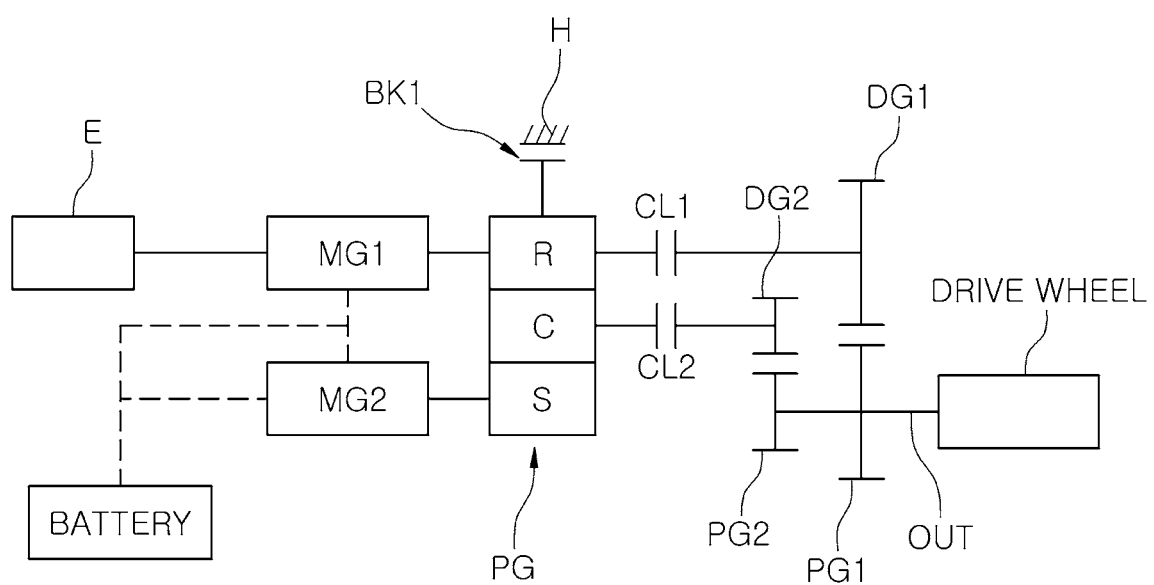
FIG. 1 is a diagram illustrating an exemplary embodiment of a powertrain for a hybrid vehicle in accordance with various aspects of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Referring to FIG. 1, an exemplary embodiment of a powertrain for a hybrid vehicle of the present invention may be configured to include a planetary gear set PG; a first motor-generator MG1 connected to one rotation element of the planetary gear set PG and an engine E connected to the first motor-generator MG1; a second motor-generator MG2 connected to another rotation element of the planetary gear set PG; a second clutch CL2 connected to the other rotation element of the planetary gear set PG and a second drive gear DG2 connected to the second clutch CL2; a first clutch CL1 connected to the rotation element to which the first motor-generator MG1 is connected and a first drive gear DG1 connected to the first clutch CL1; and an output shaft OUT having a first driven gear PG1 and a second driven gear PG2 engaged with the first drive gear DG1 and the second drive gear DG2, respectively.

The rotation element to which the first motor-generator MG1 is connected may be further provided with a brake BK1 that can constrain the rotation thereof.

Among the rotation elements of the planetary gear set PG, the rotation element connected to the engine E may be a ring gear R, the rotation element connected to the second clutch CL2 may be a carrier C, and the rotation element connected to the second motor-generator MG2 may be a sun gear S.

That is, the engine E is in turn connected to the ring gear R of the planetary gear set PG through the first motor-generator MG1 and also the first drive gear DG1 is connected to the planetary gear set PG through the first clutch CL1, the power of the engine E drives the ring gear R of the planetary gear set PG through the first motor-generator MG1 or together with the power of the first motor-generator MG1, and the power is delivered to the first drive gear DG1 if the first clutch CL1 is engaged.

Furthermore, since the second drive gear DG2 is connected to the carrier C of the planetary gear set PG through the second clutch CL2, the power of the carrier C may be delivered to the second drive gear DG2 in the state that the second clutch CL2 is engaged.

Furthermore, since the second motor-generator MG2 is connected to the sun gear S of the planetary gear set PG, the power from the second motor-generator MG2 may be directly delivered to the first drive gear DG1 through the first clutch CL1 or the second drive gear DG2 through the second clutch CL2 by the planetary gear set PG.

Meanwhile, as described above, the rotation of the ring gear R may be configured to be constrained by the brake BK1 at a transmission housing H, and thereby the brake BK1 may be operated in combination with the first clutch CL1 and the second clutch CL2 as illustrated in FIG. 2, thus implementing an operation mode of the vehicle as illustrated in FIG. 2.

A gear ratio between the first drive gear DG1 and the first driven gear PG1 may be formed to be different from a gear ratio between the second drive gear DG2 and the second driven gear PG2 to thereby form appropriate and various shift ratios necessary for the vehicle along with a gear ratio provided by the planetary gear set PG, such that the vehicle can implement an optimal driving state in more various driving conditions.

Figure 3:
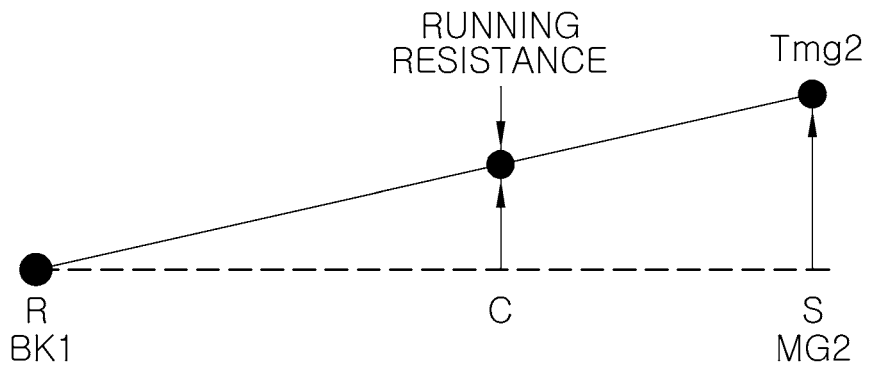
FIG. 3 is a lever diagram explaining the state that the powertrain of FIG. 1 implements an EV mode.

FIG. 3 is a lever diagram illustrating the state that the powertrain implements an EV mode driving only with the power of the motor, and illustrates the conditions that overcomes running resistance only with the power of the second motor-generator MG2 and drives the vehicle in the state that the brake BK1 constrains the rotation of the ring gear R.

In the present time, it is the state that the first clutch CL1 is disengaged and only the second clutch CL2 is engaged; and Tmg2 means a torque that the second motor-generator MG2 supplies to the planetary gear set PG through the sun gear S and indicates the conditions that the power drawn out to the drive wheel through the carrier C is balanced with the running resistance.

Figure 4:
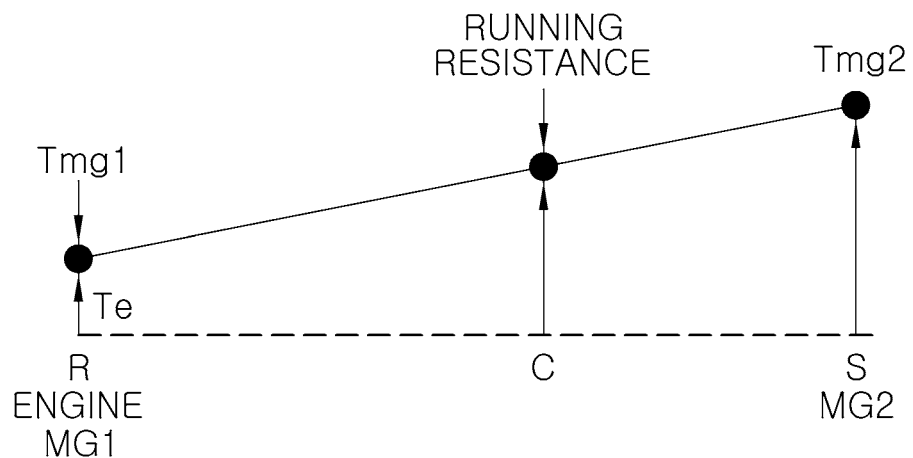
FIG. 4 is a lever diagram explaining the state that the powertrain of FIG. 1 implements a HEV mode.

FIG. 4 explains a HEV mode that the powertrain drives the vehicle using the powers of the engine E and the motor together, and means the conditions that basically as the state that the brake BK1 and the first clutch CL1 are released and the second clutch CL2 is engaged, the powers of the engine E and the first motor-generator MG1 are supplied to the planetary gear set PG through the ring gear R and the power of the second motor-generator MG2 is supplied to the planetary gear set PG through the sun gear S to thereby drive the vehicle while overcoming the running resistance through the carrier C.

Herein, the torque of the engine E is denoted as Te and the torque of the first motor-generator MG1 is denoted as Tmg1; and the arrow of the Tmg1 pointing downwardly means the conditions that the first motor-generator MG1 absorbs the torque to generate power, which corresponds to a HEV mode 1 in FIG. 2.

The first motor-generator MG1 can perform the power generation as described above, but can also function as the motor to supply the torque added to the torque of the engine E and to rotate freely without any function, such that a HEV mode 2 in FIG. 2 means the state that the first motor-generator MG1 rotates freely in the non-power generation state and a HEV mode 3 means the state that the first motor-generator as the motor supplies the torque to the planetary gear set PG; and it may be used in the conditions that a large driving force is required or acceleration is needed.

Figure 5:
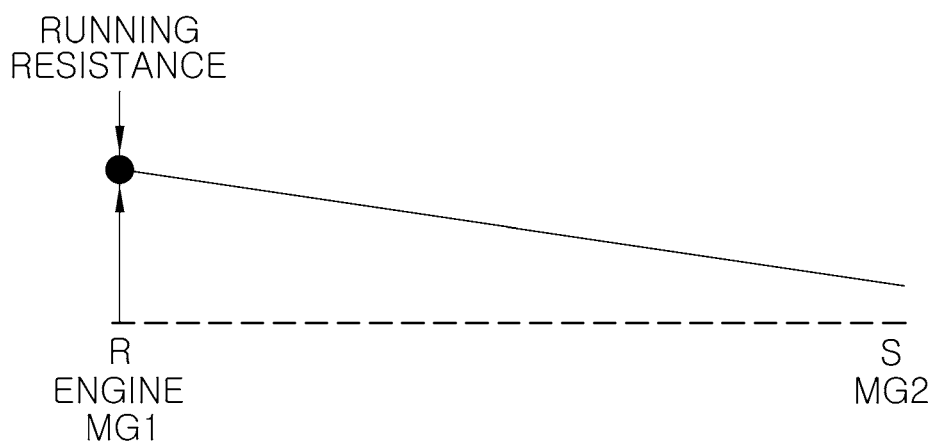
FIG. 5 is a lever diagram explaining the state that the powertrain of FIG. 1 implements an engine mode.

FIG. 5 explains the engine E mode that the powertrain drives the vehicle only with the power of the engine E, and illustrates, as the state that the brake BK1 is released, the first clutch CL1 is engaged, and the second clutch CL2 is released, the state that the power of the engine E is delivered to the drive wheel through the ring gear R and the first clutch CL1.

Even in the present time, the first motor-generator MG1 is configured as a free rotation body, a power generator, or a motor similar to the HEV mode, such that it is denoted as an engine mode 1, an engine mode 2, and an engine mode 3 in turn depending upon the aspects thereof.

In the engine modes, the power of engine E is transmitted to the drive wheel with the fixed gear ratio formed by the first drive gear DG1 and the first driven gear PG1, such that the engine E may be stably operated in a highly efficient region at a relatively high vehicle speed, thus enhancing fuel efficiency of the vehicle.

Figure 6:
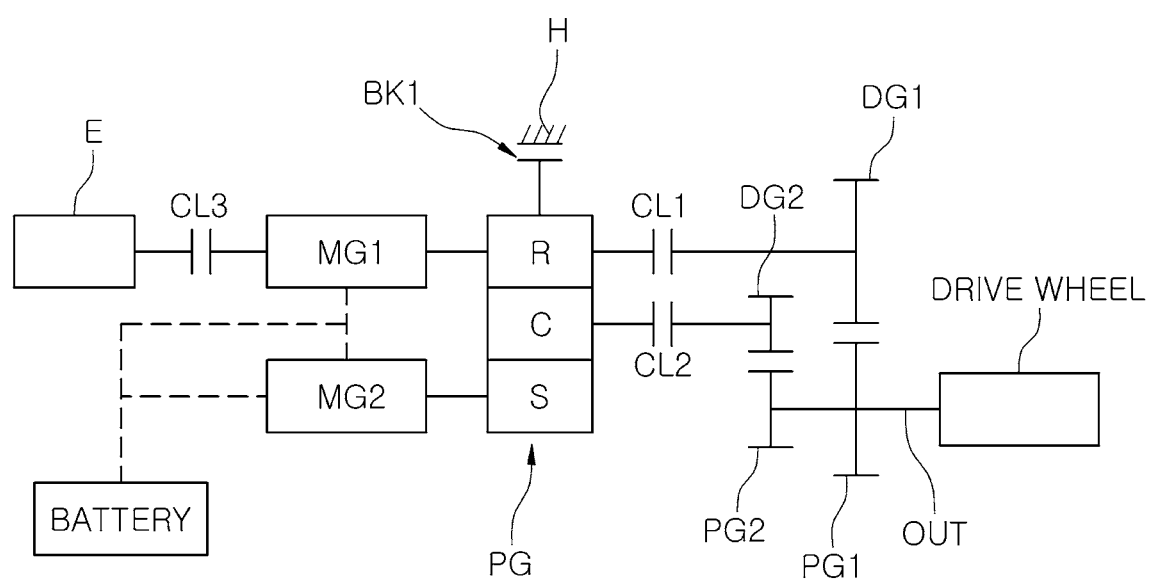
FIG. 6 is a diagram illustrating another exemplary embodiment of the present invention.

Meanwhile, FIG. 6 illustrates another exemplary embodiment of the present invention, and the other configuration is the same as the exemplary embodiment of FIG. 1 except that a third clutch is further provided between the engine E and the first motor-generator MG1 to connect or disconnect each other.

Accordingly, in the exemplary embodiment of the present invention, it functions in the same manner as in the exemplary embodiment of FIG. 1 in the state that the third clutch is engaged, but the engine E is isolated in the state that the third clutch is released, such that it is possible to implement a separate EV mode which is implemented by simultaneously driving the first motor-generator MG1 and the second motor-generator MG2.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain apparatus for a vehicle, comprising:
   a planetary gear set including a first rotation element, a second rotation element, and a third rotation element, wherein the first rotation element is engaged with the second rotation element and the second rotation element is engaged with the third rotation element;
   a first motor-generator directly connected to the first rotation element of the planetary gear set, wherein an engine of the vehicle is connected to the first rotation element through the first motor-generator;
   a second motor-generator directly connected to the third rotation element of the planetary gear-set;
   a first clutch directly connected to the first rotation element and a first drive gear;
   a second clutch directly connected to the second rotation element and a second drive gear; and
   an output shaft having a first driven gear and a second driven gear engaged with the first drive gear and the second drive gear, respectively.

2. The powertrain apparatus for the vehicle according to claim 1, wherein the first rotation element is further provided with a brake that is configured to selectively constrain a rotation of the first rotation element.

3. The powertrain apparatus for the vehicle according to claim 2, wherein the brake is mounted at a transmission housing.

4. The powertrain apparatus for the vehicle according to claim 2, wherein the first rotation element is a ring gear, the second rotation element is a carrier, and the third rotation element is a sun gear.

5. The powertrain apparatus for the hybrid vehicle according to claim 1, wherein a gear ratio between the first drive gear and the first driven gear is formed to be different from a gear ratio between the second drive gear and the second driven gear.

6. The powertrain apparatus for the vehicle according to claim 1, wherein a third clutch is further mounted between the engine and the first motor-generator to selectively connect the engine and the first motor-generator.

7. The powertrain apparatus for the vehicle according to claim 1, wherein the output shaft is connected to a drive wheel.

8. The powertrain apparatus for the vehicle according to claim 1, wherein the first rotation element of the planetary gear set is directly connected to the first motor-generator.

9. The powertrain apparatus for the vehicle according to claim 1, wherein the second motor-generator is directly connected to the third rotation element of the planetary gear set.

10. The powertrain apparatus for the vehicle according to claim 1, wherein the first clutch is directly connected to the first rotation element and the first drive gear.

11. The powertrain apparatus for the vehicle according to claim 1, wherein the second clutch is directly connected to the second rotation element and the second drive gear.

12. The powertrain apparatus for the vehicle according to claim 1, wherein the engine, the first motor-generator and the first rotation element are connected to each other in series.

* * * * *